Mar. 5, 1929.　　　G. F. ROYER　　　1,703,956
MEANS FOR PREPARING MOLDING SAND
Filed March 26, 1925
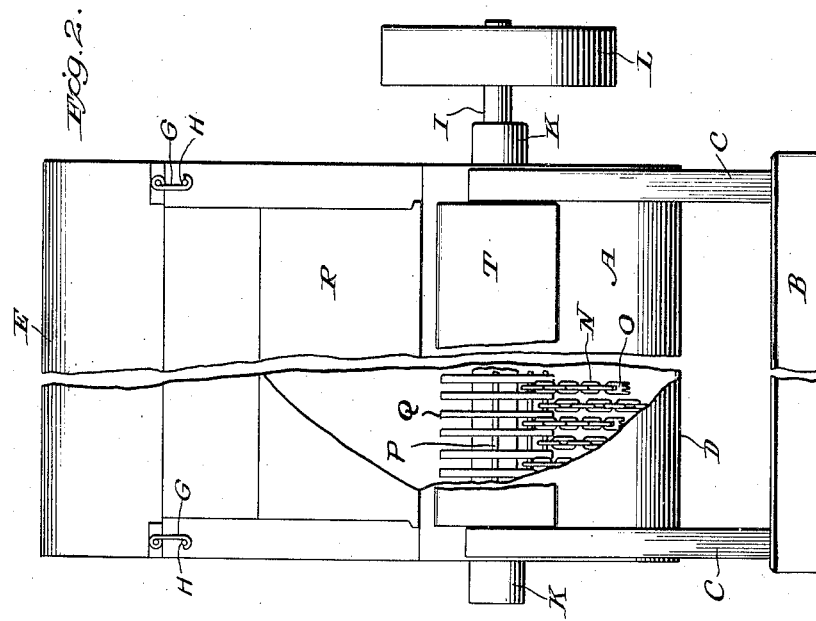
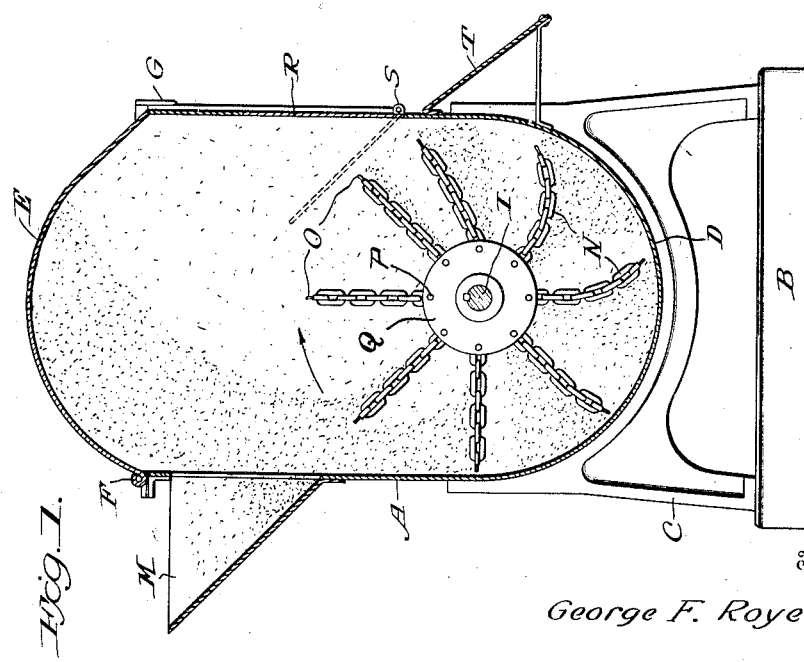
Inventor
George F. Royer,
By Cushman Bryant & Darby
Attorneys Patented Mar. 5, 1929.

1,703,956

UNITED STATES PATENT OFFICE.

GEORGE F. ROYER, OF WILKES-BARRE, PENNSYLVANIA.

MEANS FOR PREPARING MOLDING SAND.

Application filed March 26, 1925. Serial No. 18,618.

The present invention relates to an improved means for preparing molding sand or the material from which molds commonly employed for shaping fluid metal are composed.

While such material is commonly termed "sand" it necessarily includes other substances than silicon granules, such substances being required to provide the bond or connection between the silicon granules which is necessary to enable the material to retain the desired form while retaining the body of fluid metal therein.

In the preparation of such material it is advisable to employ silicon granules of various sizes or grades, as by a proper blending of granules of different sizes there results a body which, while maintaining the desired shape and retaining the body of enclosed fluid metal, permits free escape of the gases rising from the metal, as is necessary if deformation of the casting to be produced is to be avoided.

The basic sand employed in the material of the character referred to is commonly found in banks and mixed with various other ingredients, such as clay or loam in varying proportions and frequently these different ingredients are deposited in the earth in layers.

In some instances the proportions of silicon and clay, for example, in a bank are such that when the particles thereof are properly separated and blended the result will be a mixture suitable for use in preparing molds for fluid metal. Frequently, however, the silicon constituents are found in banks which are practically free from clay or other substance, which is adapted to serve as a suitable binder for the silicon granules, and, therefore, it is customary to add certain oils, commonly known as core oils, flour paste, or other plastic substance, which will provide the necessary binder for retaining the silicon granules in the desired shape.

The object of the present invention is to provide an apparatus by which silicon granules of different sizes may be effectively blended and combined with a suitable binding medium so as to produce a mixture which, while having the desired refractory nature, will permit of free escape of gases during the molding operation and to provide a simple means for providing the silicon particles with a coating of the binder.

By the means hereinafter described there is produced a product which, while having a maximum amount of permeability and strength, will contain a minimum amount of the binding substance.

By the present invention it is possible to produce, at a single operation, a material having the desirable characteristics before mentioned and which with the means heretofore employed, could only be approximated by the action of a plurality of machines or mechanisms.

The invention will be more particularly described in connection with the accompanying drawing which illustrates one embodiment thereof.

In the drawing:—

Figure 1 is a vertical sectional view through an apparatus embodying the invention.

Figure 2 is an elevation with the casing partly broken away.

In the drawings all of the parts are shown more or less conventionally, and it will be understood that there can be considerable modification of the details shown without departing from the invention.

Referring to the drawings in which corresponding parts are designated by like reference characters in the different views, A designates the body of a suitable casing which is mounted upon a base B. As shown, the body of the casing is of sheet metal and is supported from the base B by suitable castings C.

In the form the casing is preferably vertically elongated, having a curved bottom D and top E, the latter being shown as a swinging cover hinged at F to the rear upright wall and adapted to be held in closed position by hook-like members G engaging pins H projecting from the front wall of the body.

A shaft I is mounted in suitable bearings K in the end or side walls of the casing A, said shaft projecting from the casing and being adapted to be rotated by any suitable means. For the purpose of illustration the shaft is shown as provided with a pulley L by means of which, and a suitable belt, it may be rotated.

On the shaft within the casing is secured a means adapted, as the shaft rotates, to exert a combined rubbing and combing action upon the material to be treated which may be supplied to the interior of the casing, before power is applied to the shaft through the opening in the top which is closed by the cover E, or which may be fed to the interior of the casing through a suitable supply opening, with which communicates a feed hopper M.

The particular means shown for acting upon the material in the casing includes a series of flexible members N, which are attached at one end to the shaft and provided at their free ends with a comb-like device O. In the drawings the flexible members N are shown as short lengths of chain and a plurality of such members are suitably secured to a series of collars each including a hub splined or otherwise secured on the shaft I so as to rotate therewith and an annular disk member Q.

The flexible members may be connected with the shaft, or the disks thereon by any suitable means and such members can be of different character from the chains shown. For example, strips of belting of suitable length, having at their outer ends comb-like devices O may be employed instead of the sections of chain, or any other flexible or yielding means which will properly support the combs O and impart the desired rubbing action to the material may be used.

When the flexible members are of the particular character shown in the drawing the supporting disks therefor provide peripheral grooves or spaces and the inner ends of the lengths of chain are inserted in said grooves and secured to the disks by rods P extending throughout the series.

From the foregoing description and the drawings it will be seen that as the shaft I is rotated, the flexible members connected therewith, by centrifugal force, will be thrown outward and carried through the mass of material deposited on the curved bottom D. The action of the flexible members on the material will not be a breaking or crushing action, but a rubbing and combing one which will serve to coat the several silicon granules with the bonding substance and separate such granules from the mass.

As the shaft rotates the particles separated from the mass by the combing action will be carried upward into the chamber which is provided above the path of the rotary flexible members and such separated particles will commingle, falling by gravity into the paths of the rotary means repeatedly.

The shaft will be revolved at a high speed, say six hundred (600) revolutions per minute, although the particular speed employed may be varied according to the nature of the material treated.

After a very short space of time, it is found that the silicon granules will be effectively coated with the binding substance, and the granules of different sizes thoroughly blended, so that a very high grade of material for the manufacture of molds for fluid metal is provided.

The apparatus shown includes means for automatically discharging the finished product from the casing A. As shown, an aperture in the front wall of the casing is closed by a door R, which is hinged to the casing frame at S, and which may be secured in its closed position by any suitable means. When it is desired to discharge the material from the casing, the door R is moved inward to the open position indicated in dotted lines in Figure 1, in which position it will be noticed it is just out of the path of the flexible members when extended to their maximum extent. With the door in this position as the shaft is rotated, the thoroughly blended and properly coated particles will be discharged through the opening normally closed by the door R and a chute T may be employed to direct such material away from the casing.

The desired combined rubbing and coating action of the yielding members rotating with the shaft upon the material is due in some degree to providing the curved bottom D, and it will be noted that the cover E is also preferably curved or slightly dome-shaped so that the particles coming in contact therewith will be directed toward the center of the casing as they fall into the paths of the rotary means.

The parts are so proportioned that when under the action of centrifugal force the flexible disintegrators are extended to their full length, the outer ends thereof will not contact with the casing either at the sides or bottom and such parts will, therefore, not deliver a severe blow or have a pulverizing action. The interior face of the bottom D and walls of the casing A are perfectly smooth, there being no projection from such surfaces, against which the material treated could be thrown and pulverized or broken by a blow. The comb or brush-like elements O may be of any suitable material which will not fracture or break the granular particles with which they may contact.

It is believed that the advantages of the invention will be readily appreciated from the foregoing description and the drawing.

The desired materials, as taken from the bank or otherwise are deposited in the casing, a suitable fluid being added if necessary and the lid or cover being closed, the shaft I is set in rotation.

The action of the rotary members upon the mass of material is, as pointed out, a combined rubbing and combing one, whereby the several granules separated from the mass are individually coated with the binding medium and intimately commingled in the chamber above the rotary means. The particles are all repeatedly returned to the mass and subjected to the action of the rotary means, the result being that after a comparatively short period of time there is produced a very high grade mixture suitable for use in the making of molds for fluid metal. With such material a very superior grade of castings may be obtained.

No claim is herein made to the improved method described as the same will form the subject matter of a divisional application.

Having thus described the invention, what is claimed is:—

1. An apparatus for the purpose described comprising a casing closed at the top and provided with an imperforate curved bottom and side walls, and closely adjacent means rotatable about a substantially horizontal axis within the casing for agitating material deposited on the bottom, the top of the casing being spaced from the bottom a distance greater than the vertical diameter of the path of movement of said means to provide a chamber in which particles of material carried upward by the rotation of said means may commingle.

2. An apparatus for the purpose described comprising a casing having an imperforate curved bottom, a shaft within the casing provided with closely adjacent flexible members adapted as the shaft rotates to exert a rubbing effect on material supported on the casing bottom and to cause particles separated from the body of material to be carried upward above the plane of the shaft, said particles automatically returning into the path of travel of the flexible members, and means for rotating the shaft.

3. An apparatus for the purpose described comprising a casing closed at the top and provided with an imperforate curved bottom and side walls, rotatable means within the casing for agitating material deposited on the bottom, one of the walls of the casing being provided with an aperture extending above the horizontal plane of the axis of the agitating means through which particles of the treated material may be discharged by the rotation of said means, and a closure for said aperture.

4. An apparatus for the purpose described comprising a casing closed at the top and provided with an imperforate curved bottom and side walls, rotatable means within the casing for agitating material deposited on the bottom, one of the walls of the casing being provided with an aperture extending above the horizontal plane of the axis of the agitating means through which particles of the treated material may be discharged by the rotation of said means, and a closure for said aperture hinged to the casing at its lower edge, whereby it may be positioned to extend into the casing or to close said aperture.

5. An apparatus for the purpose described comprising a casing, a substantially horizontal shaft supported within the casing, a series of closely adjacent chain members each having one end connected to the shaft within the casing and provided at its other end with a comb-like device, and means for rotating the shaft.

6. An apparatus for the purpose described comprising a casing, a substantially horizontal shaft supported within the casing, a plurality of closely adjacent collars secured on the shaft within the casing, means for rotating the shaft, and a series of flexible members secured at one end to the periphery of each collar and having at their other ends means for exerting a combing action on a mass of material in the path of said members, for the purpose described.

7. An apparatus for the purpose described comprising a casing, a substantially horizontal shaft supported within the casing, a plurality of closely adjacent collars secured on the shaft within the casing and each provided with an annular peripheral disk, a plurality of short lengths of chain each having one end secured within the space between the disks of adjacent collars and provided at its free end with a comb-like device, and means for rotating the shaft.

8. An apparatus for the purpose described comprising a casing having a closure at its top, means rotatable about a substantially horizontal axis within the casing adapted to exert a combined rubbing and combing action on material deposited in the casing, the casing providing a chamber above the path of said rotating means in which particles separated from the mass of material by the combing action will commingle, which chamber has a discharge outlet through a side wall of the casing, and a closure for said discharge opening.

9. An apparatus for preparing material suitable for use in making molds for shaping fluid metal, and including silicon granules and a bonding substance, comprising a relatively stationary casing closed at the top and having imperforate bottom and side walls, means within the casing mounted to rotate about a horizontal axis to disintegrate and agitate the particles of a mass of the material in the casing so that the silicon granules will be coated with the bonding substance and thoroughly blended or mixed, one of the vertical walls of the casing extending parallel with the length of the axis of said rotary means having a suitable discharge aperture formed therein, and a movable closure for such aperture.

In testimony whereof I have hereunto set my hand.

GEORGE F. ROYER.